United States Patent
Ohno et al.

(10) Patent No.: US 7,394,607 B2
(45) Date of Patent: Jul. 1, 2008

(54) DISK DRIVE WITH POSITION DETECTION

(75) Inventors: Jun Ohno, Kanagawa (JP); Hiroyasu Tanabe, Kanagawa (JP); Noboru Suzuki, Gunma-ken (JP); Toshiaki Tsuyoshi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 114 days.

(21) Appl. No.: 11/517,190

(22) Filed: Sep. 6, 2006

(65) Prior Publication Data

US 2007/0058281 A1 Mar. 15, 2007

(30) Foreign Application Priority Data

Sep. 7, 2005 (JP) ............................. 2005-259652

(51) Int. Cl.
*G11B 15/04* (2006.01)
*G11B 21/02* (2006.01)
*G11B 5/596* (2006.01)

(52) U.S. Cl. ..................... 360/60; 360/57; 360/75; 360/77.02; 360/78.04

(58) Field of Classification Search .................. None
See application file for complete search history.

(56) References Cited

U.S. PATENT DOCUMENTS

| 6,185,063 | B1 | 2/2001 | Cameron | |
|---|---|---|---|---|
| 2005/0168861 | A1* | 8/2005 | Furuhashi | ................ 360/75 |
| 2006/0227449 | A1* | 10/2006 | Che et al. | ................ 360/75 |

FOREIGN PATENT DOCUMENTS

JP 2003-263850 9/2003

* cited by examiner

*Primary Examiner*—Andrew L. Sniezek
(74) *Attorney, Agent, or Firm*—Townsend and Townsend and Crew LLP; Patrick Duncan

(57) ABSTRACT

Embodiments of the invention provide a disk drive capable of writing information on data tracks even more positively when a shingle write method is adopted. In one embodiment, the disk drive is characterized in that, when information is to be written on a plurality of adjacent data tracks on a recording medium through the shingle write method, writing of information is controlled by detecting an actual writing position based on servo information recorded on the recording medium and determining whether or not the detected actual writing position meets a predetermined condition.

20 Claims, 4 Drawing Sheets

DISK DRIVE WITH POSITION DETECTION

CROSS-REFERENCES TO RELATED APPLICATIONS

This application claims priority from Japanese Patent Application No. JP2005-259652, filed Sep. 7, 2005, the entire disclosure of which is incorporated herein by reference.

BACKGROUND OF THE INVENTION

The present invention relates to a disk drive, such as a hard disk.

In recent years, hard disks have been mounted in various types of equipment, expanding their application areas. Under these circumstances, a number of techniques are proposed to increase information recording capacity, while promoting further reduction in size of the hard disk itself. Among these, a method is typically known, in which data tracks are recorded like a shingle roof such that part of adjacent data tracks is overwritten sequentially from an inner to outer circumference of a recording medium (the method will hereinafter be referred to as a shingle write method). This achieves data tracks, each being narrower than a recording width a magnetic head actually writes.

The aforementioned method, however, involves a problem. Specifically, when, for example, data is written in a k-th data track as counted from the inner circumference, it is necessary to rewrite all data tracks covering from the k-th one to the outermost circumference. To reduce an overhead of this need of rewriting, Patent Document 1 (U.S. Pat. No. 6,185,063) discloses a technique as detailed in the following.

Specifically, in the technique disclosed in Patent Document 1, two data tracks are paired up to form a group and recording is performed within this group through the shingle write method. More specifically, of the two data tracks included in the group, the data track on the inner circumference side is recorded and then the data track on the outer circumference side is recorded. Part of the data track on the outer circumference side is not overwritten and the data track on the outer circumference side is one having a recording width of the magnetic head.

The technique disclosed in Patent Document 1 permits relatively flexible rewriting of data. Specifically, a read position is varied between odd-numbered data tracks and even-numbered data tracks. This allows the read position to be set by avoiding an overwriting portion (an overlapping portion) of the data tracks paired up into a group (see FIG. 10 of Patent Document 1).

BRIEF SUMMARY OF THE INVENTION

There are, however, problems with the shingle write method. For example, the position of the magnetic head may be deviated by an effect of disturbance or the like when information is to be written in a data track. Should this happen, the information is written in a position deviated from the position of the intended data track. Because of a relationship involved with adjacent data tracks, a narrower data track width results, making it difficult to perform processing for reproducing the information.

The present invention addresses the above-cited and associated problems and it is a feature of the present invention to provide a disk drive capable of writing information on data tracks even more positively when the shingle write method is adopted.

An aspect of the present invention provides a disk drive comprising a recording medium, a magnetic head, and a control device. The recording medium has servo information written thereon and is formed with a data track, part of the data track being overwritten by an adjacent data track on an inner or outer circumference side. The magnetic head writes or reads information to or from the recording medium. The control device calculates an offset amount used for adjusting a position of the magnetic head when the magnetic head overwrites part of an adjacent data track or reads information from the partly overwritten data track and moves the magnetic head to an offset position, to which the magnetic head is moved over the calculated offset amount from a predetermined position defined by the servo information, thereby executing a write or read operation of information. The control device detects, when information is written on a plurality of adjacent data tracks on the recording medium, the offset position based on the servo information and controls writing of information according to whether or not the detected offset position meets a predetermined condition.

Writing of information may be controlled by determining whether or not writing of information on the subsequent data track is halted according to whether the detected offset position meets the predetermined condition.

It is also appropriate that the detected offset position be corrected according to whether or not the detected offset position meets the predetermined condition and information written at the detected offset position be rewritten at an offset position incorporating the correction.

A method of controlling a disk drive according to an embodiment of the present invention is provided for a disk drive that comprises a recording medium having servo information written thereon and formed with a data track, part of the data track being overwritten by an adjacent data track on an inner or outer circumference side and a magnetic head for writing or reading information to or from the recording medium. The method comprises the steps of: (a) calculating an offset amount used for adjusting a position of the magnetic head when the magnetic head overwrites part of an adjacent data track or reads information from the partly overwritten data track and moving the magnetic head to an offset position, to which the magnetic head is moved over the calculated offset amount from a predetermined position defined by the servo information, thereby executing a write or read operation of information; and (b) detecting, when information is written on a plurality of adjacent data tracks on the recording medium, the offset position based on the servo information and controlling writing of information according to whether or not the detected offset position meets a predetermined condition.

DETAILED DESCRIPTION OF THE INVENTION

Figure 1:
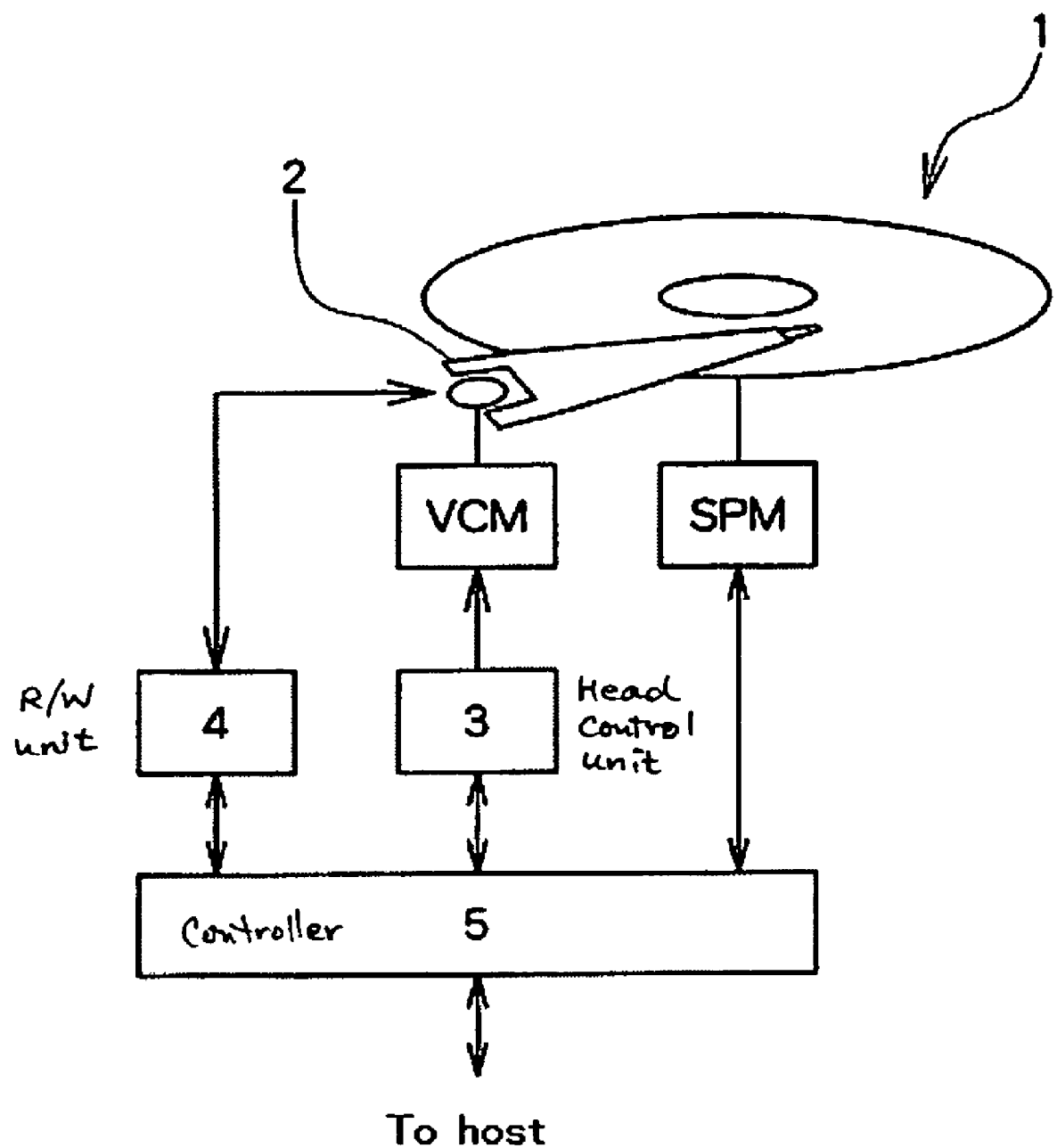
FIG. 1 is a block diagram showing schematically a disk drive according to an embodiment of the present invention.

A specific embodiment to which the present invention is applied will be described below with reference to the accompanying drawings. Referring to FIG. 1, a disk drive according to the embodiment of the present invention includes a recording medium 1, a head assembly 2, a head control unit 3, a read/write (RW) unit 4, and a controller 5. FIG. 1 is a block diagram showing schematically the disk drive.

The recording medium 1 is rotatably driven by a spindle motor SPM. The recording medium 1 includes a plurality of data tracks formed concentrically thereon. In addition, a servo information portion and a data track portion are recorded in a circumferential direction. The same servo information as the conventional one is recorded on the servo information portion. The servo information includes servo address information and servo burst information. The servo address information is used for moving the magnetic head to a desired track for reading or writing data. The servo burst information is used, after the magnetic head has been moved to the desired track, for positioning a write head or a read head precisely on the track.

The head assembly 2 includes the write head and the read head. While making a relative movement over a surface of the recording medium 1, the head assembly 2 uses the write head to magnetically write information relative to the recording medium 1. The head assembly 2 also uses the read head to read a magnetic pattern written on the recording medium 1.

The head control unit 3 drives a voice coil motor VCM for controlling the position of the head assembly 2, thereby moving the magnetic head over the recording medium 1.

The RW unit 4 encodes a signal inputted from the controller 5 and provides the magnetic head of the head assembly 2 with an output of the encoded information as an electric signal. The RW unit 4 also decodes information written based on the electric signal inputted from the magnetic head and provides the controller 5 with an output of results of the decoding.

The controller 5 is typically a microprocessor run in accordance with a program stored in a storage device not shown. Receiving an input of information to be written from a computer as a host for the disk drive, the controller 5 provides the RW unit 4 with an output of the corresponding information. The controller 5 also issues a command to the head control unit 3 in order to move the magnetic head to a writing position of the information on the recording medium 1. In accordance with the embodiment of the present invention, when performing a read/write operation, an offset value for achieving shingle write is added relative to the conventional track position defined by servo information, thereby controlling the head control unit 3 for the position of the magnetic head. Calculation of the offset value involved herein is well-known and a detailed description for the same will be omitted.

When information is to be written in the plurality of adjacent data tracks on the recording medium 1, the controller 5 according to the embodiment of the present invention controls writing of the information as detailed below. Specifically, based on servo information, the controller 5 first detects the position that incorporates the offset value (this position is to be called "offset position"), which represents the actual writing position. The controller 5 then determines whether the detected offset position meets a predetermined condition. This processing performed by the controller 5 will be described later.

On receiving a command from the host computer to read information written in the recording medium 1, the controller 5 issues a command to the head control unit 3 to move the magnetic head to a position at which the corresponding information is written. The controller 5 thereafter provides the host computer side with an output of the decoding results provided by the RW unit 4.

That is, the disk drive according to the embodiment of the present invention is connected to the host computer and works as follows. Specifically, when a command is received from the host computer to write information, the controller 5 outputs the information to be written to the RW unit 4 in accordance with the command. The RW unit 4 encodes the information and generates and outputs the corresponding electric signal. The magnetic head of the head assembly 2 converts the electric signal to a corresponding magnetized signal, magnetizing the recording medium 1 so as to write the corresponding information thereon.

Similarly, when a command is received from the host computer to read information written in the recording medium 1, the controller 5 issues a command to the head control unit 3 to move the magnetic head to a corresponding position at which the information to be read is written. The head control unit 3 controls the head assembly 2 to move the magnetic head to the corresponding position on the recording medium 1. The information read by the magnetic head from the corresponding position is outputted to the RW unit 4. The RW unit 4 decodes the information and outputs the decoded information to the controller 5. The controller 5 then outputs the decoded information to the host computer.

Figure 2:
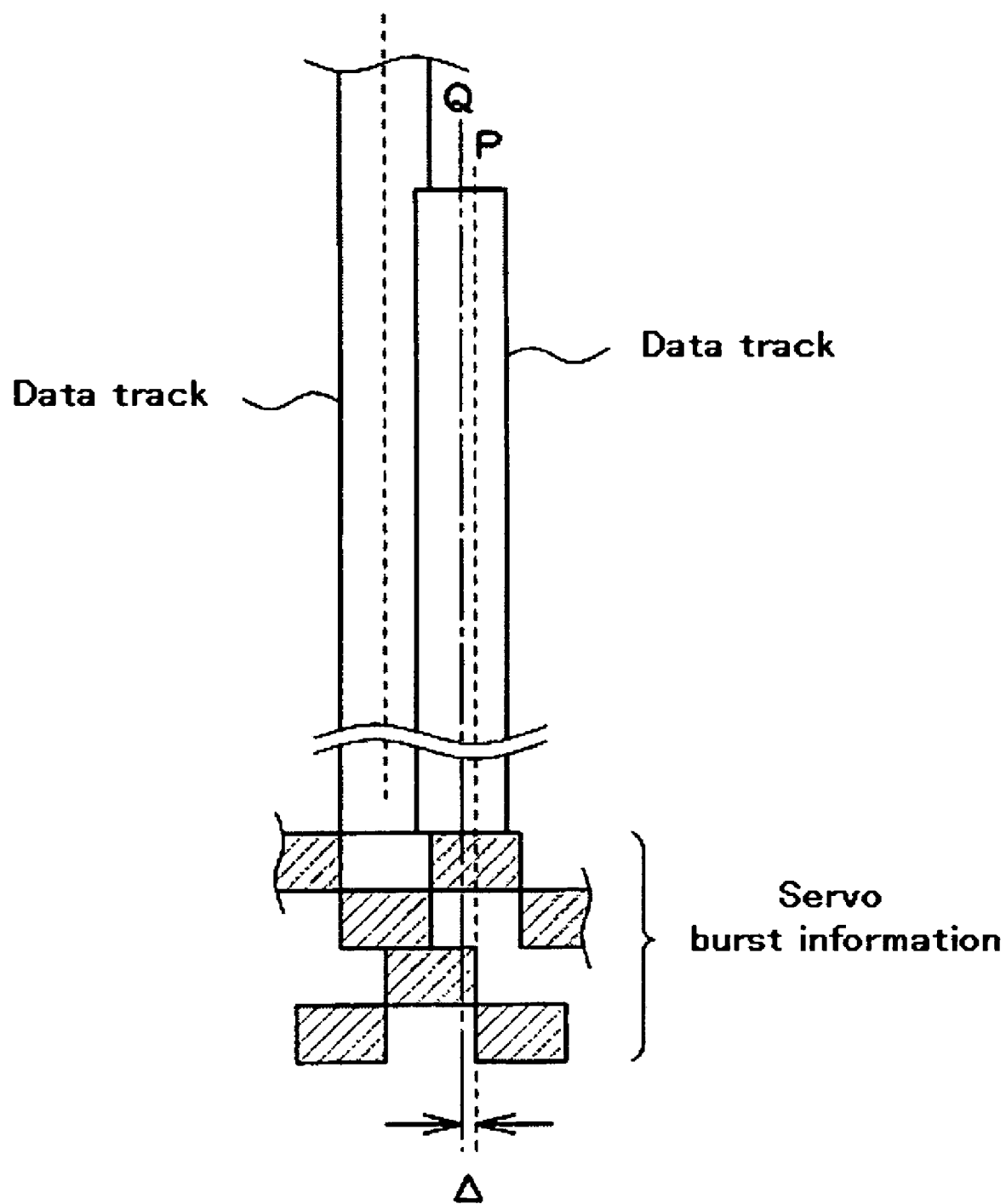
FIG. 2 is a view for illustrating a typical formation of data tracks in the disk drive according to the embodiment of the present invention.

Operation of the controller 5 will be described. In writing information, the controller 5 writes information along the circular, concentric data tracks formed on a surface of the recording medium 1. The controller 5 at this time issues a command to the head control unit 3 to move the write head. Referring to FIG. 2, the position to which the write head is moved at this time is, more specifically, a position Q that represents a position P established based on the servo information, to which an offset value A calculated through a predetermined method is added. The position Q is a position of the data track to be written (hereinafter referred to as "data track of current interest"). Concentric data tracks are formed by overwriting part of the data track written immediately before with the data track of current interest at this position that incorporates the offset value (that is, the "offset position"). Shingle write is thereby achieved.

Figure 3:
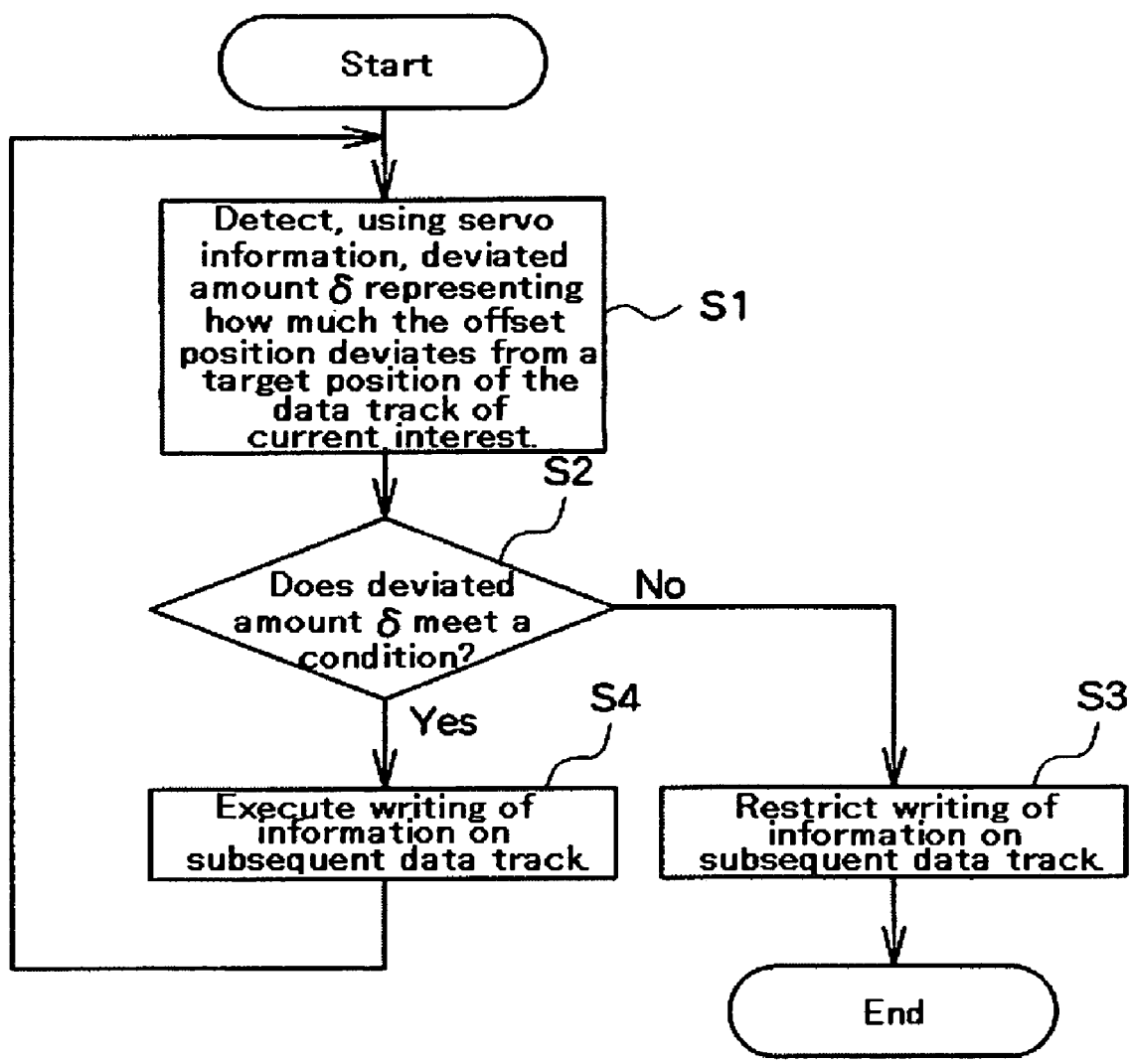
FIG. 3 is a flowchart showing an example of processing performed in the disk drive according to the embodiment of the present invention.

In accordance with the embodiment of the present invention, in writing information on the data track of current interest, the controller 5 executes processing shown in FIG. 3. When writing information at the offset position, the controller 5 uses the read head to refer to the servo information and detect an amount of deviation $\delta$ that represents how much the offset position (in this case, the position of the write head) deviates from a target position of the data track of current interest (step S1).

The deviated amount $\delta$ can be detected based on the servo burst information of the servo information. If the read head is off-center with respect to the write head, the controller 5 corrects the deviated amount $\delta$ detected based on the servo burst information by using a central position between the two magnetic heads, thereby establishing the deviated amount $\delta$.

The controller 5 examines if the deviated amount $\delta$ meets the predetermined condition (step S2). Typically, the controller 5 uses the deviated amount $\delta$ to find a distance (track pitch) Pr between the data track of current interest actually written and a target position of the data track to be next written adjacent to the data track of current interest (to be referred to as "subsequent data track"). The controller 5 thereby determines if a ratio of this current track pitch Pr to a predetermined track pitch Pc (Pr/Pc) falls within the range between 0.7 and 1.3 (±30%).

If Pr/Pc falls outside the aforementioned range (step S2 is answered No), the controller 5 determines that the condition is not met. The controller 5 then restricts writing of information on the subsequent data track (step S3), terminating the processing. If the condition is met (step S2 is answered Yes), the controller 5 controls the position of the write head (step S4) in order to continue with writing of information on the subsequent data track. The controller 5 thus returns to step S1 to continue performing processing with the subsequent data track defined as a new data track of current interest.

In the exemplary case described above, processing is terminated by halting writing of the information on the subsequent data track in step S3. In this case, further approach may be taken. Specifically, the operation is set in a wait state until the recording medium 1 is rotated n complete turns (n being an integer of 1 or more). Then, the offset position (target position) for writing information on the subsequent data track is calculated again and processing is started over again from step S2 (retry processing). In step S2, the ratio of the distance (track pitch) Pr between the writing position of the data track of current interest and the target position of the subsequent data track to the predetermined track pitch Pc (Pr/Pc) falls within the range between 0.7 and 1.3 (±30%).

Figure 4:
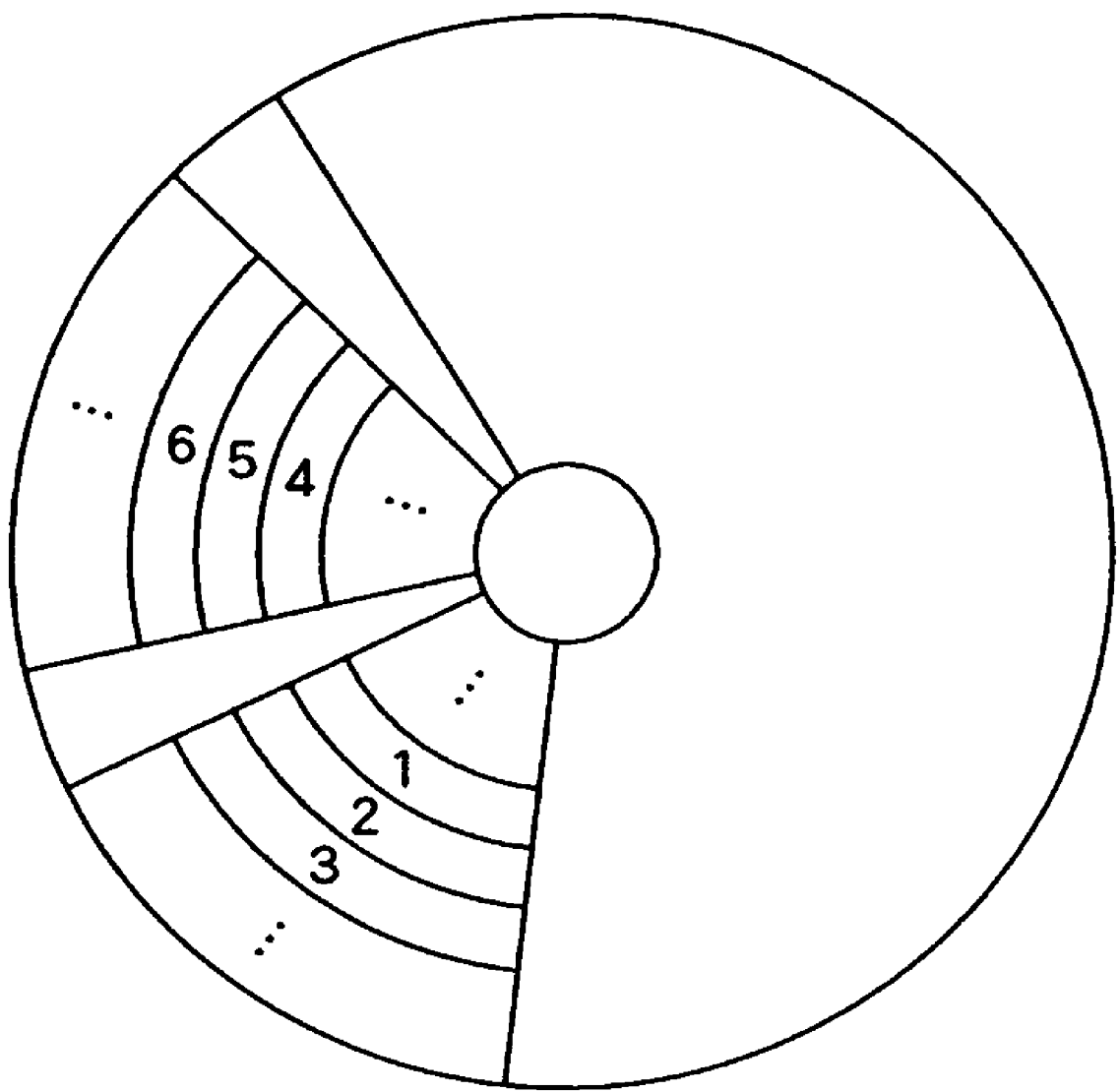
FIG. 4 is a view for illustrating an example of sequence in which the writing operation is performed on the data tracks in disk drive according to the embodiment of the present invention.

It is also appropriate that the target position of the data track to be next written be corrected based on the deviated amount δ detected during writing of the data track of current interest. This correction is made, for example, by defining a target position Xm after correction as Xm=X+γ×δ relative to a target position X established using the offset value. Where, γ is a coefficient of feedback that may typically be a value from about 0.7 to 1.0. If such a correction is made, a rotational sync component of the recording medium 1 may be corrected. In addition, with the aim of helping make the operation less susceptible to effect from the rotational sync component or the like, the operation may proceed as follows. Specifically, for example, the write operation is performed sequentially on adjacent data tracks by making a radial movement for each sector. When the writing is performed for a predetermined number of data tracks, a movement is made in the rotational direction of the recording medium 1. The write operation is then performed again sequentially on adjacent data tracks by radially moving for each sector. In this case, sequence in writing for each sector is schematically as shown in FIG. 4.

It is further appropriate that the controller 5 perform the following operation by storing and retaining in a storage unit (not shown) information that represents the writing position of the data track (called "preceding data track") adjacent to, and written prior to, the data track of current interest. (The information stored and retained represents the deviated amount δ during writing of the preceding data track.) Specifically, the controller 5, when having performed a retry processing of writing information on the data track of current interest, counts the number of times the retry processing performed (retry count). If writing on the subsequent data track is not enabled even when the retry count value exceeds a predetermined count threshold value, the controller 5 may rewrite the data track of current interest.

In this rewriting, the controller 5 executes the processing shown in FIG. 3. Specifically, the controller 5 uses the difference (track pitch) between the actual writing position of the preceding data track retained in the storage unit and the target position used for rewriting on the data track of current interest, and a predetermined track pitch. If the ratio of these track pitch values meets the condition of step S2, the controller 5 perform the write operation on the data track of current interest. When information is rewritten as described above, the range of step S2 may be narrowed relative to that used in the first writing, e.g., from 0.8 to 1.2 (±20%), so that the target position may be more closely approximated.

In accordance with the embodiment of the present invention, if the writing position is deviated from the target position by disturbance, the amount of corresponding deviation is detected using the servo information and the subsequent write operation is thereby restricted or a write operation is thereby performed a second time. This allows the writing operation of information on the data tracks when the shingle write method is adopted to be performed more positively.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive, comprising:
   a recording medium having servo information written thereon and formed with a data track, part of the data track being overwritten by an adjacent data track on an inner or outer circumference side;
   a magnetic head for writing or reading information to or from the recording medium; and
   a control device configured to calculate an offset amount used for adjusting a position of the magnetic head when the magnetic head overwrites part of an adjacent data track or reads information from the partly overwritten data track and moving the magnetic head to an offset position, to which the magnetic head is moved over the calculated offset amount from a predetermined position defined by the servo information, thereby executing a write or read operation of information;
   wherein the control device detects, when information is written on a plurality of adjacent data tracks on the recording medium, the offset position based on the servo information and controls writing of information according to whether or not the detected offset position meets a predetermined condition.

2. The disk drive according to claim 1,
   wherein writing of information is controlled by determining whether or not writing of information on the subsequent data track is halted according to whether the detected offset position meets the predetermined condition.

3. The disk drive according to claim 1,
   wherein the detected offset position is corrected according to whether or not the detected offset position meets the predetermined condition and information written at the detected offset position is rewritten at an offset position incorporating the correction.

4. The disk drive according to claim 3,
   wherein the offset position incorporating the correction Xm=X+γ×δ, where X is the target position of the data track without the correction, δ is the detected amount of deviation, and γ is a coefficient of feedback.

5. The disk drive according to claim 4,
   wherein γ is about 0.7 to 1.0.

6. The disk drive according to claim 1,
   wherein the control device determines whether or not the detected offset position meets a predetermined condition by detecting an amount of deviation that represents how much the offset position deviates from a target position of the data track of current interest, using the amount of deviation to find a current track pitch Pr between the data track of current interest actually written and a target position of the data track to be next written adjacent to the data track of current interest, and determining if a ratio of the current track pitch Pr to a preset track pitch Pc, Pr/Pc, falls within a preset range.

7. The disk drive according to claim 6,
wherein the preset range is ±30%.

8. The disk drive according to claim 6,
wherein writing of information on the subsequent data track is halted if the ratio Pr/Pc is outside the preset range.

9. The disk drive according to claim 6,
wherein the detected offset position is corrected if the ratio Pr/Pc is outside the preset range, and information within at the detected offset position is rewritten at an offset position incorporating the correction.

10. The disk drive according to claim 9,
wherein the control device detects, when information is rewritten, the offset position based on the servo information and controls writing of information according to whether or not the detected offset position meets a narrowed predetermined condition in which the preset range is narrowed for the ratio Pr/Pc.

11. A method of controlling a disk drive which includes a recording medium having servo information written thereon and formed with a data track, part of the data track being overwritten by an adjacent data track on an inner or outer circumference side, and a magnetic head for writing or reading information to or from the recording medium, the method comprising:

(a) calculating an offset amount used for adjusting a position of the magnetic head when the magnetic head overwrites part of an adjacent data track or reads information from the partly overwritten data track and moving the magnetic head to an offset position, to which the magnetic head is moved over the calculated offset amount from a predetermined position defined by the servo information, thereby executing a write or read operation of information; and (b) detecting, when information is written on a plurality of adjacent data tracks on the recording medium, the offset position based on the servo information and controlling writing of information according to whether or not the detected offset position meets a predetermined condition.

12. The method according to claim 11,
wherein writing of information is controlled by determining whether or not writing of information on the subsequent data track is halted according to whether the detected offset position meets the predetermined condition.

13. The method according to claim 11,
wherein the detected offset position is corrected according to whether or not the detected offset position meets the predetermined condition and information written at the detected offset position is rewritten at an offset position incorporating the correction.

14. The method according to claim 13,
wherein the offset position incorporating the correction $Xm=X+\gamma \times \delta$, where X is the target position of the data track without the correction, $\delta$ is the detected amount of deviation, and $\gamma$ is a coefficient of feedback.

15. The method according to claim 14,
wherein $\gamma$ is about 0.7 to 1.0.

16. The method according to claim 11, further comprising:
determining whether or not the detected offset position meets a predetermined condition by detecting an amount of deviation that represents how much the offset position deviates from a target position of the data track of current interest, using the amount of deviation to find a current track pitch Pr between the data track of current interest actually written and a target position of the data track to be next written adjacent to the data track of current interest, and determining if a ratio of the current track pitch Pr to a preset track pitch Pc, Pr/Pc, falls within a preset range.

17. The method according to claim 16,
wherein the preset range is ±30%.

18. The method according to claim 16,
wherein writing of information on the subsequent data track is halted if the ratio Pr/Pc is outside the preset range.

19. The method according to claim 16,
wherein the detected offset position is corrected if the ratio Pr/Pc is outside the preset range, and information within at the detected offset position is rewritten at an offset position incorporating the correction.

20. The method according to claim 19, further comprising:
detecting, when information is rewritten, the offset position based on the servo information and controlling writing of information according to whether or not the detected offset position meets a narrowed predetermined condition in which the preset range is narrowed for the ratio Pr/Pc.

* * * * *